US009256380B1

(12) United States Patent
Daniel et al.

(10) Patent No.: US 9,256,380 B1
(45) Date of Patent: Feb. 9, 2016

(54) APPARATUS AND METHOD FOR PACKET MEMORY DATAPATH PROCESSING IN HIGH BANDWIDTH PACKET PROCESSING DEVICES

(71) Applicant: Xpliant, Inc., San Jose, CA (US)

(72) Inventors: Tsahi Daniel, Palo Alto, CA (US); Enric Musoll, San Jose, CA (US); Dan Tu, San Bruno, CA (US)

(73) Assignee: Xpliant, Inc., San Jose, CA (US)

( * ) Notice: Subject to any disclaimer, the term of this patent is extended or adjusted under 35 U.S.C. 154(b) by 200 days.

(21) Appl. No.: 14/142,612

(22) Filed: Dec. 27, 2013

Related U.S. Application Data

(60) Provisional application No. 61/778,289, filed on Mar. 12, 2013.

(51) Int. Cl.
*G06F 12/08* (2006.01)
*G06F 3/06* (2006.01)

(52) U.S. Cl.
CPC ............ *G06F 3/0644* (2013.01); *G06F 3/0619* (2013.01); *G06F 3/0689* (2013.01)

(58) Field of Classification Search
CPC .............................. G06F 12/08; G06F 12/1081
See application file for complete search history.

(56) References Cited

U.S. PATENT DOCUMENTS 6,744,438 B1 * 6/2004 Baldwin ................. G06T 11/40
345/531
2007/0297437 A1 * 12/2007 Akella ................ H04L 49/3036
370/428

* cited by examiner

*Primary Examiner* — Yong Choe
(74) *Attorney, Agent, or Firm* — Cooley LLP (57) ABSTRACT

A method of processing packets includes receiving packets and assigning the packets to different pages, where each page represents a fixed amount of memory. The different pages are distributed to different pools, where each pool has a unique mapping to banks, and where each bank is a set of memory resources. The different pages from the different pools are assigned to different banks in accordance with the unique mapping.

18 Claims, 6 Drawing Sheets

APPARATUS AND METHOD FOR PACKET MEMORY DATAPATH PROCESSING IN HIGH BANDWIDTH PACKET PROCESSING DEVICES

CROSS-REFERENCE TO RELATED APPLICATION

This application claims priority to U.S. Provisional Patent Application Ser. No. 61/778,289, filed Mar. 12, 2013, the contents of which are incorporated herein by reference.

FIELD OF THE INVENTION

This invention relate to processing packets in a computer network. More particularly, this invention relates to packet memory datapath processing in high bandwidth packet processing devices.

BACKGROUND

A packet processing device usually needs to buffer the packets into a packet memory while it processes them. The size of some packets (for example Ethernet packets) is not known upfront, so the device needs to start storing the packet into the packet memory without knowing how large the packet is. Moreover, packets arrive at the device in an interleaved fashion, so the device is simultaneously storing several incoming packets into the packet memory.

One solution is to reserve as much packet memory as the maximum possible packet size, so once the start of a packet is detected, the packet starts to be stored at the current memory pointer; then the current memory pointer is updated by adding the maximum packet size, and becomes the memory pointer where the next incoming packet will be stored at. Once the packets are processed and transmitted, their space in the packet memory (the fixed maximum packet size) can be freed and reused for other packets. In this scheme, the management of the packet memory by the packet memory manager is simple and each packet is associated with a single pointer into the packet memory (where the packet starts).

The problem with this solution is that it wastes a lot of packet memory since a maximum packet size is allocated for each packet regardless of the size of the packet. This implies that the packet memory needs to be very large to accommodate all the packets that need to be simultaneously processed to meet the bandwidth demands of the device. Since the packet memory is a very expensive resource (especially if it is implemented on-chip using SRAM), this solution is not cost effective.

Accordingly, it would be desirable to provide improved techniques for packet memory management in high bandwidth packet processors.

SUMMARY OF THE INVENTION

A method of processing packets includes receiving packets and assigning the packets to different pages, where each page represents a fixed amount of memory. The different pages are distributed to different pools, where each pool has a unique mapping to banks, and where each bank is a set of memory resources. The different pages from the different pools are assigned to different banks in accordance with the unique mapping.

A packet processor has a packet memory. A packet memory manager is in communication with the packet memory to allocate resources in the packet memory in accordance with a mapped hierarchy between pages, where each page represents a fixed amount of memory. Pools are assigned to a subset of the pages and banks are assigned to a subset of the pools. Each bank represents a set of memory resources. The packet memory manager assigns selected pages to a selected pool, which distributes the selected pages to the banks associated with the selected pool, such that the mapped hierarchy provides load distribution within the packet memory.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION

The state of the art solution to mitigate the problem of wasted memory is to assign multiple chunks (called pages) of packet memory to each packet, rather than a single big chunk. With this scheme, the packet is no longer stored consecutively in the packet memory; rather, it is scattered in one or more pages throughout the packet memory. Therefore, the packet memory manager needs to maintain a linked list of all the pages that a particular packet uses in the packet memory, and traverse the linked list when the packet is read out of the packet memory for transmission. The packet memory manager needs to provide multiple pages to the clients that perform the storing of the packet, and free up the multiple pages of the packet when the packet has been transmitted out. This solution creates more complexity in the packet memory manager, but reduces the waste of memory.

In page based packet processing devices there is a tradeoff between the amount of wasted packet memory and the bandwidth demands placed on the packet memory manager. The larger the page size, the less state the packet memory manager maintains (there are fewer pages in the link list per packet, and therefore there are fewer accesses to the packet memory manager to maintain). Reducing the demands placed on the packet memory manager is desirable because of the large number of clients in a high bandwidth packet processor. Satisfying all the simultaneous requests requires a costly packet memory manager implementation. On the other hand, the smaller the page size, the lower the waste of packet memory. Reducing the unused portion of the packet memory enables a smaller packet memory, thus saving precious on-chip area for other packet processing functions.

Figure 1:
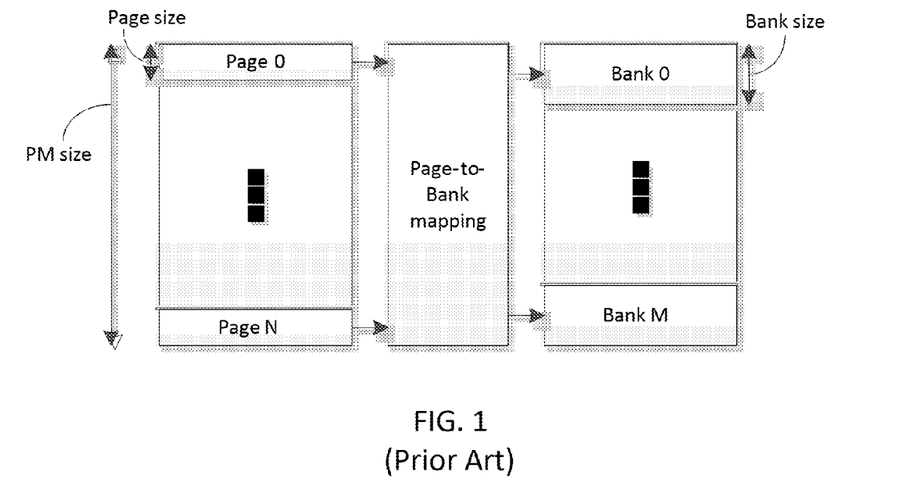
FIG. 1 illustrates a prior art mapping of pages to banks.

In state of the art packet processing devices, the packet memory is implemented with a set of individual memories called banks. FIG. 1 illustrates a prior art scheme with a set of pages ranging from Page 0 to Page N, which in total corresponds to a packet memory size. The Figure also illustrates a set of banks ranging from Bank 0 to Bank M. In general, the number of pages is much larger than the number of banks. A page-to-bank mapping module is used to place individual pages in individual banks.

Figure 2:
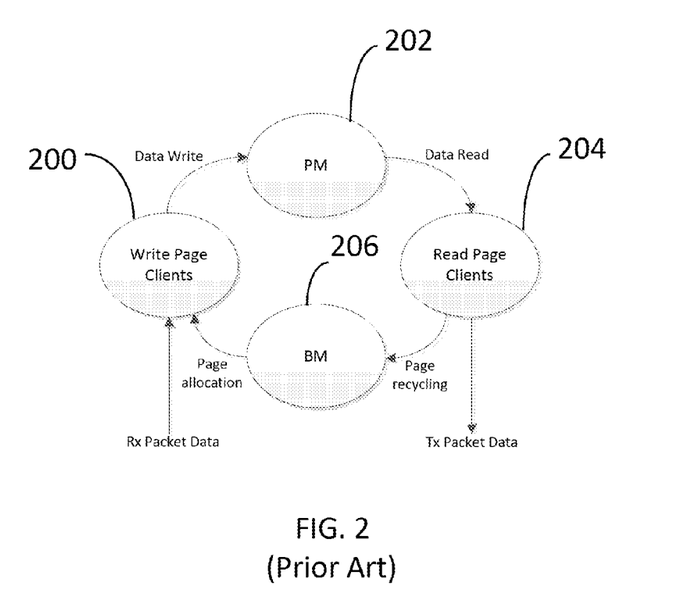
FIG. 2 illustrates a state diagram between write page clients, packet memory, read page clients and a packet memory manager.

FIG. 2 illustrates a state diagram of prior art operations between write page clients 200, packet memory 202, read page clients 204 and a packet memory manager or buffer manager (BM) 206. Received packets are processed by the write page clients 200, which write pages to packet memory 202. Read page clients 204 read pages from packet memory 202 and transmit retrieved packets. The packet memory manager 206 recycles freed pages from the read page clients 204 and allocates pages to the write page clients 200.

Accesses can simultaneously occur to the banks (and also within a bank, depending on how many ports a bank implements). The data in a page can be served (read/written) by several banks. The mapping of pages to banks is implementation dependent; it also depends on the internal datapath width of the device. It is fundamental that all banks are used in a balanced fashion; otherwise the overall device performance can be severely reduced.

In order to guarantee that all the banks are simultaneously used by the different clients of the packet memory manager, the different pages are organized in pools. Since the pages within a pool are served by the same set of banks, the packet memory manager just needs to make sure that pages are distributed to the clients in a load balance way across pools.

Figure 3:
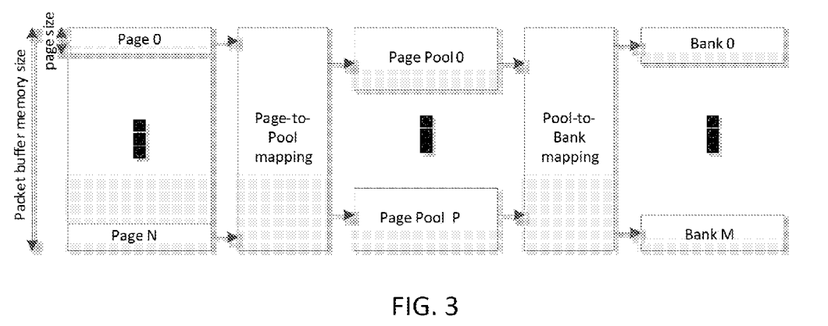
FIG. 3 illustrates mapping between pages, pools and banks in accordance with an embodiment of the invention.

FIG. 3 shows the relation between a pool and the pages and banks. In particular, the figure shows the same set of pages with Page 0 through Page N and the same set of banks with Bank 0 through Bank N. However, compared to FIG. 1, there is now an intermediate step that decouples the direct mapping between pages and banks. In particular, there is a set of pools, in this case, Pool 0 through Pool P. The number of pools is lower than the number of banks.

Figure 4:
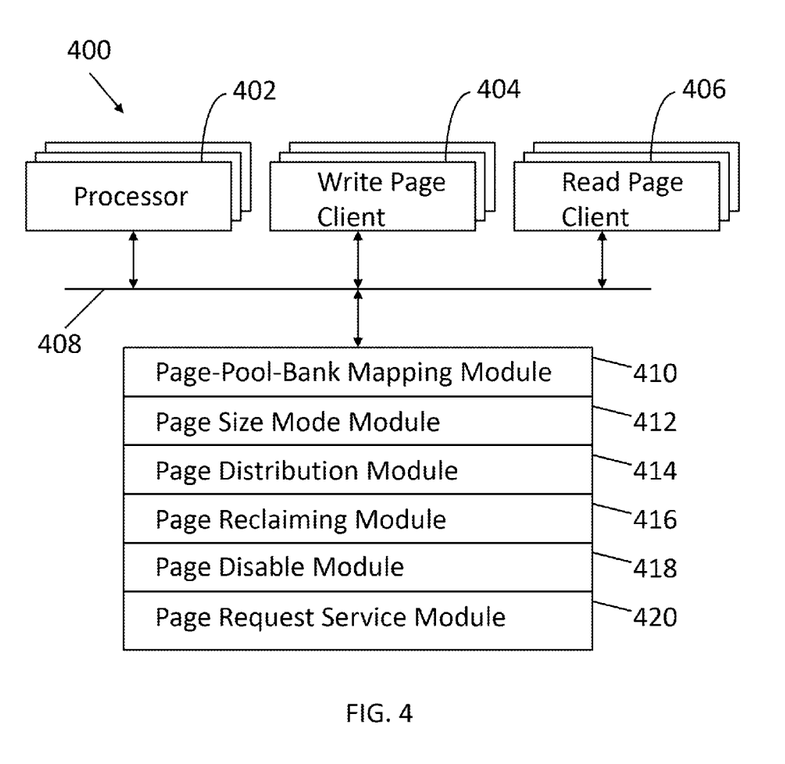
FIG. 4 illustrates a packet memory manager configured in accordance with an embodiment of the invention.

FIG. 4 illustrates a packet memory manager 400 configured in accordance with an embodiment of the invention. The packet memory manager 400 includes one or more processors 402 connected to one or more write page clients 404 and read page clients 406 via a bus 408. The write page clients 404 may be individual receive direct memory access blocks associated with individual input ports. The write page clients 406 may be individual transmit direct memory access blocks associated with individual output ports. A set of processing modules 410-420 are also connected to the bus 408. The processing modules may be implemented in silicon, firmware or source code. The operations of the individual modules are discussed below.

Figure 5:
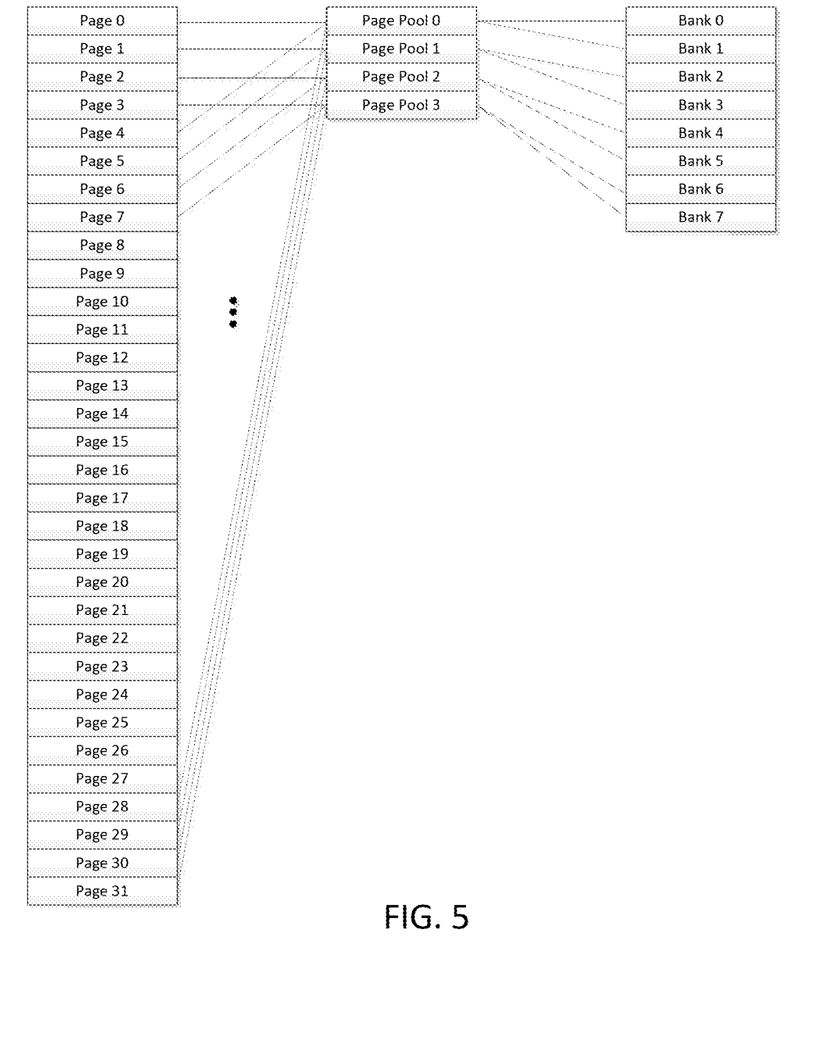
FIG. 5 illustrates an example of mapping pages to pools to banks in accordance with an embodiment of the invention.

A page-pool-bank mapping module 410, as its name implies, maps individual pages to pools, which in turn map the pages to individual banks. FIG. 5 shows an example for the purpose of illustration (in real devices, the total number of pages will be significantly higher). The example shows 32 pages, 4 pools and 8 banks. Any number of mapping schemes may be used. However, it is important that the mapping is balanced (i.e., each pool has the same number of pages, and each pool is served by the same number of banks).

In this particular example, pool 0 has pages 0, 4, 8, ..., 28; pool 1 has pages 1, 5, 9, ... 29, and so on. Note that each pool has a fixed number of banks associated to it. Therefore, if at any given time the device is working with a similar number of pages of each pool, the memory resources will be fully utilized and the performance will not be degraded. The page-pool-bank mapping module 410 enforces this mapping schema. Preferably, the mapping schema is configurable by a user.

In this embodiment, all the pages have the same size; however, other more sophisticated implementations could choose to have pages of different sizes and dynamically pick the page size to use based on some information about the incoming packet. A page size mode module 412 may be used for variable sizing of pages.

Because of the effect that the size of the page has on the bandwidth requirements of the packet memory manager, a mode can be implemented where the size is larger. For certain applications, the reduction in latency and/or complexity in the packet memory manager by having a larger page size may be more important than the memory wasted. Therefore, it is desirable to have an operational mode in which the page size can be changed. The size of the pages is the same within a mode.

Figure 6:
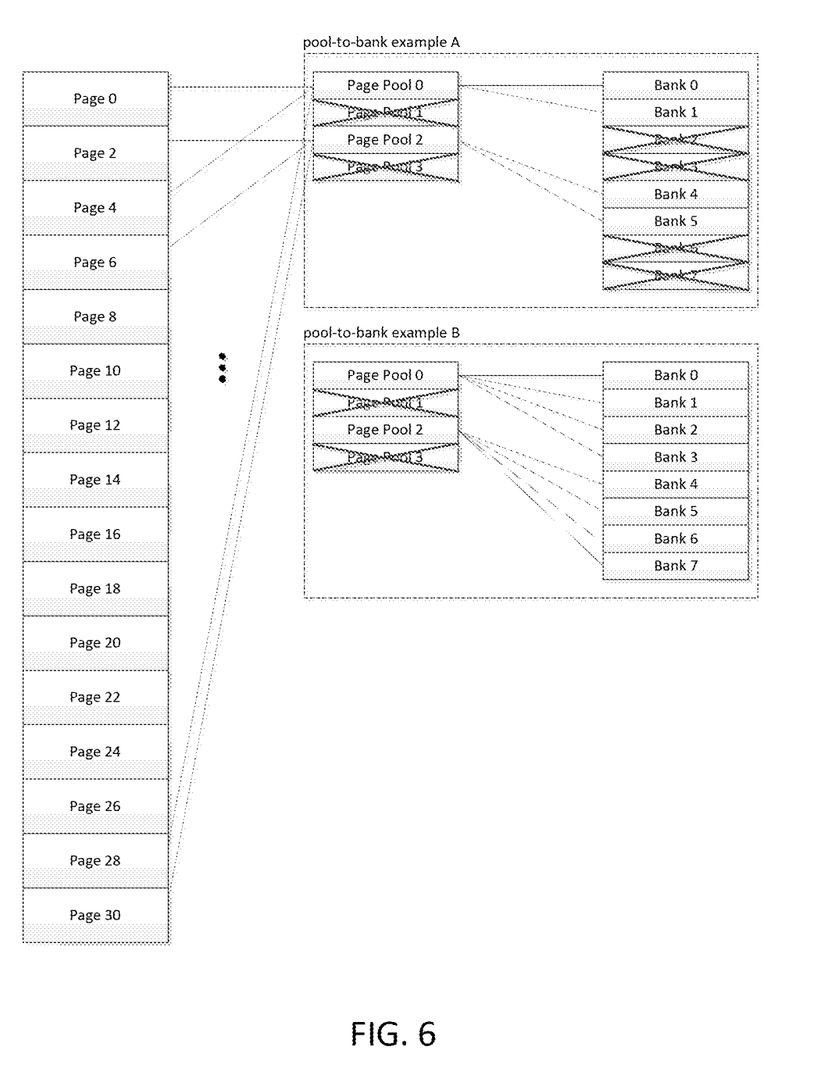
FIG. 6 illustrates variable page sizing and disabled bank processing in accordance with embodiments of the invention.

For example, under the same scenario of FIG. 5, if the total packet size and the number of pools and banks are maintained, but the page size is doubled (so the total number of pages is half), the new mapping and pages active in the system is shown in FIG. 6.

The numbering of the pages is maintained with respect to the scenario in FIG. 5, except that only half the page numbers are used, in this case the even numbered pages. That is, a given page number maps into the same place in the packet memory space regardless of the page-size mode in which the device operates. A given page number also maps to the same pool. Thus, the packet memory manager is configured to create a unique assignment between pages and pools for each different page size, while the banks assigned to the pools remains static. In this example, each different page size is a multiple of a page size. In the example of FIG. 6, page 0 comprises page 0 and page 1 of FIG. 5.

FIG. 6 also shows two pool-to-bank mappings A and B (other mappings are also possible). In mapping A, half of the banks are not used, as shown with an "X" through a bank. This mode may be for power reduction purposes, where those unused banks can be shut down. Alternately, this mode may be required for yield purposes, where some banks have defects. In mapping B, all the banks are used (this mode provides the highest packet bandwidth performance).

Page distribution may be implemented with a page distribution module 414. In high packet data bandwidth devices there are many clients (a function of how many packet ports the device features) that require pages to store the incoming packets. These clients may require the pages at a very high rate (a function of the speed of the ports the clients serve). The combination of both requirements yields a packet memory manager design with many high-rate page delivery interfaces to the clients, which makes the packet memory manager design complex.

The page distribution module 414 provides a set of free pages at a time (called a bundle), where the pages in a bundle belong to the same pool. This way the rate of page delivery from the packet memory is reduced (by a factor proportional to the number of free pages in each bundle). This mechanism requires that the clients buffer the pages in a bundle since they may not use them all at once. This buffering in the client side provides a latency reduction benefit since the client no longer sees the full latency of getting the pages from the packet memory manager, as long as the clients have enough buffered pages at all time.

Figure 7:
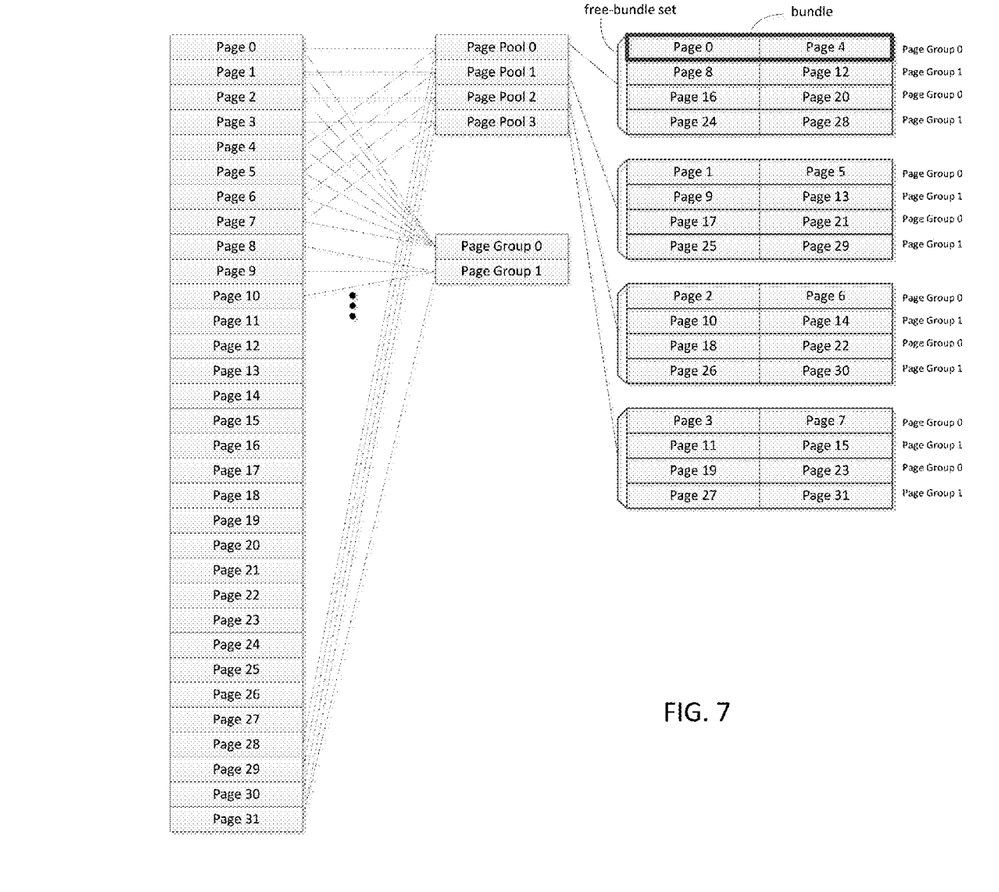
FIG. 7 illustrates the bundling of pages in accordance with an embodiment of the invention.

FIG. 7 shows the bundles that each pool would provide to the clients under the same example scenario presented in FIG.

5. The example shows the bundles that are ready right after reset. That is, the packet memory manager has gathered the free pages (all the pages in this example), bundled them, placed them in each pool's free-bundle set, and is waiting for the clients to request the bundles.

Note that a new mapping (page-to-group) is shown in FIG. 7. The purpose of this mapping will be explained in more detail when describing the mechanism for page reclaiming. Page reclaiming is implemented with a page reclaiming module 416.

The pages that are provided by the packet memory manager to the clients need to be reclaimed by the packet memory manager at the same rate. Clients release pages one at a time, and therefore the packet memory manager needs to bundle them and add the bundles to the corresponding pool's free-bundle set. The logic to do this in the packet memory manager could be complex since pages are released simultaneously by several clients, and more than a single bundle could be implicated if enough clients release pages of the same pool. On the other hand, a simpler implementation would compose a bundle a page at a time, stalling if necessary the release of other pages of the same pool, and placing the bundle to the free-bundle set when completed. This implementation however may not meet the required page allocation rate since bundles are generated at a slower rate.

An embodiment composes several bundles at a time, and places one newly-composed bundled at a time to the corresponding pool's free-bundle set. If more than one bundled is composed in a given cycle, a round-robin policy may be used to select one bundle to be sent to the pool's free-bundle set.

There are as many simultaneously composed bundles per pool as number of page groups. FIG. 7 illustrates page grouping, in this case, two groups—Group 0 and Group 1. For each page group bundle, at most one page is populated per cycle; this helps reduce the complexity of composing a bundle.

Due to the utilization of pages across pools, within a pool, and across page groups, clients will release pages uniformly across all page groups in a pool so there will be candidate pages to compose the different bundles within a pool. If the required allocation rate of bundles is 1 bundle every C cycles per pool, then the composition rate should also be one bundle every C cycles per pool. If the bundle has P pages and there are G groups, this formula applies:

$$G \geq C/P$$

For example, if the rate of bundle allocation to the clients is one bundle every 4 cycles per pool and the number of pages is two per bundle, then the number of groups should be no less than 2.

Figure 8:
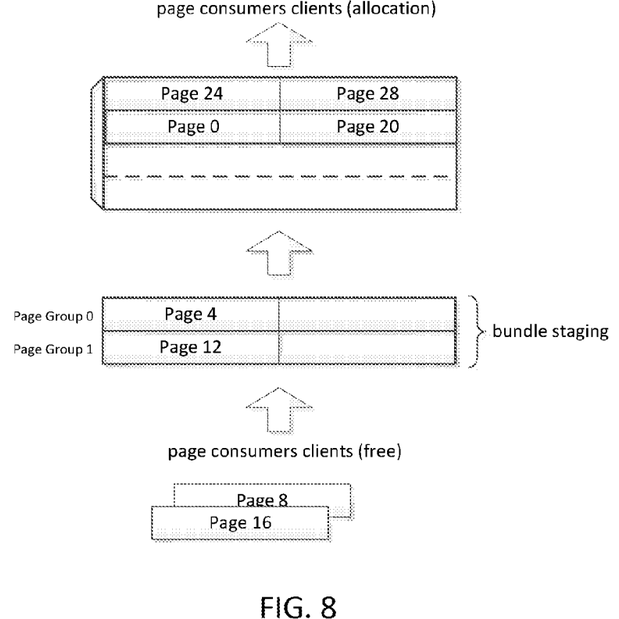
FIG. 8 illustrates an example of how pages are bundled for pool 0 for the example of FIG. 5.

FIG. 8 shows an example (same scenario as in FIG. 4) of how pages are bundled for pool 0. The last two bundles generated after reset still have not been sent to the clients and are in the free-bundle set. The first two bundles have been sent to the clients. Page 4 (page group 0) and page 12 (page group 1) have already been used by the clients and released back to the packet memory manager. The packet memory manager has placed page 4 in the bundle for page group 0, and page 12 in the bundle for page group 1. These two bundles in the process of being formed are in the bundle staging. The other two pages left in the pool (page 8 and 16) will eventually be released by the clients and when that happens, the packet memory manager will complete the bundles in the bundle staging. When page 8 gets released, the bundle associated with group 1 will be completed and will be sent to the free-bundle set. Similarly, when page 16 gets released, the bundle associated with group 0 will be completed and will be sent to the free-bundle set. The free-bundle set is shown organized as a FIFO, although it does not necessarily need to be that way (it could be organized as a LIFO, for example).

As shown before in FIG. 7, the initial sequence of bundles in the free-bundle set had an alternating sequence of page groups. This sequence is not necessarily maintained as bundles are dynamically provided to the clients and pages are released. Bundles can be composed in any order in the bundle staging and be sent to the free-bundle set. Moreover, the place of a page within a bundle may vary every time the page is recycled.

As indicated above, there may be power saving considerations or yield considerations that result in certain banks not being used. The page disable module 418 may be utilized in such circumstances. The bundling mechanism of delivering free pages to the clients may be leveraged to allow the disabling of a limited number of pages. For example, after reset, each free-bundle set is allowed to include all but a few bundles. Software has knowledge of which portions of the packet memory are faulty, so it can swap the pages in the free-bundle set with pages that have not been used by the hardware to generate the bundles. Once software has completed this operation, it notifies the hardware to enable sending bundles to the clients.

This mechanism assumes that software has read/write access to the contents of the free-bundle sets. Note that software may also write the full content of the free-bundle sets itself, but that may take a long time which adversely affects the boot time of the device.

Figure 9:
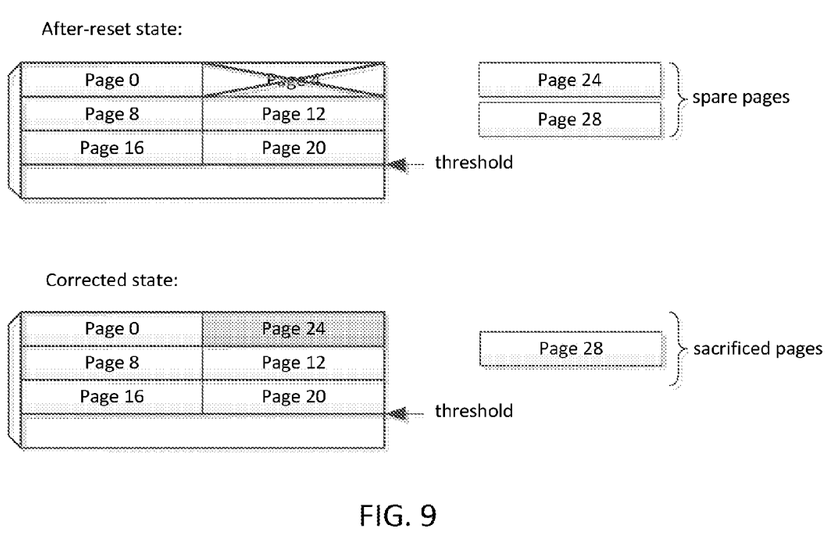
FIG. 9 illustrates a mechanism where hardware is allowed to generate all the bundles except one.

FIG. 9 illustrates this mechanism with an example. Hardware is allowed to generate all the bundles except one (the threshold in the set determines how many bundles the hardware can generate). The two pages (24 & 28) in the bundle that is not generated are candidates to be swapped with faulty pages. In the example, it is shown that faulty page 4 is replaced by page 24. Page 28 is never used in the device.

In order to have a good balance of memory resource usage within a given packet, the sequence of pages that a client uses should correspond to consecutive pools. This may be implemented with a page request service module 420. For example, in the scenario of FIG. 5, a packet that needs four pages should ideally use one page of each pool, so that all the banks will be used. This reduces the contention to that packet data when the data is written and, more importantly, when it is read out for transmission.

Therefore, if a client used a page from pool p last time, when it needs another page for the same packet it should try to use a page from pool (p+1)/P where P is the number of pools. If the client does not have any pages buffered for that pool, then it is fine to use a page from another pool, but the logic that provides the individual pages out of the buffered pages should try to satisfy the request for a particular pool.

Once a page is selected for usage, the starting bank within the page needs to be selected. It is important to load balance the accesses to the banks. In the same scenario of FIG. 5, if the last page used of pool p by a certain client did not fully use all the page (for example only the first bank associated with that page was used), then the next page out of that same pool p should start storing the packet data not at the beginning of the page, but at the middle of the page, so the second bank is used first, and the write pointer of the page wraps around if more than page_size/2 data has to be written. In other words, if the last bank written for page_$\{i\}$ is bank_$\{j\}$, then the first bank written for page_$\{i+1\}$ is bank_$\{j+1\}$/NUM.Banks, where page $\{i\}$ and page $\{I+1\}$ are two pages from the same pool of pages consequentively used by a writing client. This way a single write client can load balance itself across all banks associated with a particular pool. Thus, within a pool the usage of the banks is balanced.

When the packet is read out for transmission, a state field needs to be provided by the packet memory manager that indicates which bank within the page the packet data in that page starts.

The implementation described above assumes that each client has its own state to remember the last pool and bank used. A different implementation would feature the same state but for each pool rather than for each client. This implementation may achieve a higher degree of load balancing across the banks, but it is more complex since there is contention to the state by the different clients.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A packet processor, comprising:
   a packet memory; and
   a packet memory manager in communication with the packet memory to allocate resources in the packet memory in accordance with a mapped hierarchy between pages, wherein each page represents a fixed amount of memory, pools assigned to a subset of the pages, and banks assigned to a subset of the pools, wherein each bank represents a set of memory resources, wherein the packet memory manager assigns selected pages to a selected pool, which distributes the selected pages to the banks associated with the selected pool, such that the mapped hierarchy provides load distribution within the packet memory.

2. The packet processor of claim 1 wherein the packet memory manager is configured to process different page sizes, wherein each different page size is a multiple of a page size.

3. The packet processor of claim 2 wherein the packet memory manager is configured to create a unique assignment between pages and pools for each different page size.

4. The packet processor of claim 1 wherein the packet memory manager is configured to bundle a subset of pages assigned to a common pool and communicate the bundle as a single element.

5. The packet processor of claim 4 wherein the packet memory manager is configured to map pages to groups.

6. The packet processor of claim 1 wherein the packet memory manager is configured to observe disabled banks.

7. The packet processor of claim 6 wherein the packet memory manager is configured to alter assignments between pools and banks in response to disabled banks.

8. The packet processor of claim 6 wherein the packet memory manager is configured to reserve pages for swapping with pages assigned to disabled banks.

9. A method of processing packets, comprising:
   receiving packets;
   assigning the packets to different pages, wherein each page represents a fixed amount of memory;
   distributing the different pages to different pools, wherein each pool has a unique mapping to banks, and wherein each bank is a set of memory resources; and
   assigning the different pages from the different pools to different banks in accordance with the unique mapping.

10. The method of claim 9 further comprising operating in alternate modes with different page sizes, wherein each different page size is a multiple of a page size.

11. The method of claim 10 further comprising creating a unique assignment between pages and pools for each different page size, while maintaining the banks assigned to pools.

12. The method of claim 9 further comprising bundling a subset of pages assigned to a common pool and communicating the bundle as a single element.

13. The method of claim 12 further comprising reclaiming pages by composing several bundles simultaneously and freeing one newly composed bundle at a time.

14. The method of claim 9 further comprising load balancing page writes across all banks associated with a pool.

15. The method of claim 9 further comprising mapping pages to groups.

16. The method of claim 9 further comprising observing disabled banks.

17. The method of claim 16 further comprising altering assignments between pools and banks in response to disabled banks.

18. The method of claim 16 further comprising reserving pages for swapping with pages assigned to disabled banks.

* * * * *